United States Patent
Sugawara et al.

(10) Patent No.: US 6,844,669 B2
(45) Date of Patent: Jan. 18, 2005

(54) GLASS FUNNEL FOR A CATHODE RAY TUBE AND PROCESS FOR ITS PRODUCTION

(75) Inventors: Tsunehiko Sugawara, Funabashi (JP); Mikio Ueki, Funabashi (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/601,806

(22) Filed: Jun. 24, 2003

(65) Prior Publication Data

US 2004/0041514 A1 Mar. 4, 2004

(30) Foreign Application Priority Data

Jun. 24, 2002 (JP) .................................... 2002-182994

(51) Int. Cl.$^7$ .................. H01J 31/00; H01J 61/30; H01K 1/42; C03C 15/00
(52) U.S. Cl. ................ 313/480; 313/477 R; 220/2.1 A; 220/2.3 A; 445/24; 445/25; 65/30.13; 65/30.11
(58) Field of Search ............................ 313/480, 477 R; 445/24, 25; 220/2.1 A, 2.3; 65/30.11, 30.13

(56) References Cited

U.S. PATENT DOCUMENTS

| | | | |
|---|---|---|---|
| 3,850,605 A | | 11/1974 | Maltman et al. |
| 4,102,665 A | * | 7/1978 | Plumat et al. .............. 65/30.13 |
| 4,253,861 A | | 3/1981 | Graff et al. |
| 4,397,667 A | * | 8/1983 | Morimoto et al. ......... 65/30.13 |
| 6,607,999 B2 | * | 8/2003 | Hachitani ................... 501/69 |

FOREIGN PATENT DOCUMENTS

| | | |
|---|---|---|
| JP | 46-1329 | 9/1971 |
| JP | 48-71672 | 9/1973 |
| JP | 49-23216 | 3/1974 |
| JP | 53-3413 | 1/1978 |
| JP | 53-41691 | 11/1978 |
| JP | 54-21366 | 7/1979 |
| JP | 54-30688 | 10/1979 |
| JP | 55-144451 | 11/1980 |
| JP | 55-154352 | 12/1980 |
| JP | 55-167157 | 12/1980 |
| JP | 55-167158 | 12/1980 |
| JP | 57-175751 | 10/1982 |
| JP | 61-232250 | 10/1986 |
| JP | 4-285039 | 10/1992 |
| JP | 6-115974 | 4/1994 |
| JP | 2904067 | 6/1999 |
| JP | 2939415 | 8/1999 |
| JP | 2001-294442 | 10/2001 |
| JP | 2001-302278 | 10/2001 |
| JP | 2001-348245 | 12/2001 |
| JP | 2001-348248 | 12/2001 |
| JP | 2002-60242 | 2/2002 |

* cited by examiner

Primary Examiner—Nimeshkumar D. Patel
Assistant Examiner—Matt Hodges
(74) Attorney, Agent, or Firm—Oblon, Spivak, McClelland, Maier & Neustadt, P.C.

(57) ABSTRACT

A glass funnel for a cathode ray tube, which has a substantially rectangular opened end at one end and a neck portion at the other end and which constitutes, together with a glass panel having a substantially rectangular face portion, a glass bulb to be used for a cathode ray tube, wherein the glass constituting the glass funnel contains, by molar percentage, at least 60% of $SiO_2$ and at least 7% of PbO; when the molar percentages of $Na_2O$ and $K_2O$ contained in said glass are represented by WNa and WK, respectively, $0.35 \leq WK/(WNa+WK) \leq 0.6$; a compressive stress layer is formed by chemical tempering at least in the outer surface of a region containing a position where the tensile stress formed when the interior of the glass bulb is vacuumed to produce the cathode ray tube, becomes maximum; and either one or both of the outer surface of the chemically tempered region and the inner surface opposite to said outer surface, are colored by ion exchange coloration.

6 Claims, 3 Drawing Sheets

GLASS FUNNEL FOR A CATHODE RAY TUBE AND PROCESS FOR ITS PRODUCTION

The present invention relates to a glass funnel for a cathode ray tube wherein a locally chemically tempered region is colored by ion exchange, and a process for its production.

In recent years, many image display devices other than a cathode ray tube have been practically used, and as compared with such display devices, the depth and weight of the cathode ray tube are regarded as substantial drawbacks along with the trend for a larger size. Accordingly, it is strongly desired to reduce the depth and to reduce the weight. However, if the depth is reduced in a conventional cathode ray tube, the structural asymmetry of the cathode ray tube will increase, whereby there will be a problem that a large tensile vacuum stress far exceeding the breaking strength of glass will be formed in the glass funnel. At the same time, the increase in the above asymmetry of the cathode ray tube and in the difference in the wall thickness due to the trend for a larger size, will increase the thermal stress generated during the operation or in the process for producing the cathode ray tube.

Whereas, if the wall thickness of glass is made thin to reduce the weight, the rigidity of glass usually decreases, whereby the deformation energy will increase, and the increase of the deformation energy will increase the tensile stress, whereby decrease in safety due to fracture or decrease in reliability due to delayed fracture will be increased. If the wall thickness of glass is increased, it is possible to control the deformation energy and to prevent the above-mentioned increase of the stress, but the weight will increase on the other hand.

Heretofore, as a means to reduce the weight of a glass funnel for a cathode ray tube, it has been practically carried out to form a compressive stress layer in a thickness of about ⅙ of the thickness of the glass on the surface of a glass funnel by means of a thermal tempering method, as disclosed in Japanese Patent 2,904,067.

However, in the case of a glass funnel, for example, in the case of a glass funnel for a cathode ray tube having a screen with a diagonal conjugate diameter of 86 cm and a deflection angle of 110°, the maximum glass thickness at the sealing portion with the glass panel usually exceeds 13 mm, while the minimum glass thickness at the sealing portion with the neck portion is less than 3 mm. Namely, the maximum wall thickness is more than 4 times the minimum wall thickness, and it is impossible to uniformly quench the glass funnel having such an uneven wall thickness distribution. As a result, the strengthening of the glass funnel by a thermal tempering method has not yet been put to practical use, because a large residual tensile stress develops in the surface concurrently with the compressive stress due to an uneven temperature distribution.

On the other hand, it is known to strengthen the surface of a glass funnel by a chemical tempering method thereby to reduce the weight. This method is a method wherein specific alkali ions in glass are replaced by larger ions at a temperature lower than the annealing temperature range to form a compressive stress layer in the surface by the volume increase. The chemical tempering method by such thermal diffusion (hereinafter referred to as a thermal diffusion method) is more advantageous in the weight reduction than the thermal tempering in that a relatively large compressive stress can be obtained and an undesired tensile stress is not generated.

Usually, glass to be used for a glass funnel contains at least 60 mol % of $SiO_2$ as the major component and from about 7 to 8.5 mol % of PbO in order to increase the X-ray absorptive power. In addition, it contains an oxide of an alkali metal such as sodium or potassium from the necessity to let the thermal expansion coefficient match with that of another material or from the necessity to secure a proper viscosity at a high temperature taking into consideration the melting property and moldability of the glass.

On the other hand, the above-mentioned glass is required to have high electric resistance so as to withstand against a high voltage and not to cause dielectric breakdown during the operation of the cathode ray tube. For this purpose, two components of sodium and potassium should be well balanced, so that a high electric resistance is realized by a mixed alkali effect. For example, as a usual glass composition to be used for a glass funnel, a $SiO_2$—$Al_2O_3$—PbO—$R_2O$—R'O system ($R_2O$: an alkali metal oxide, R'O: an alkaline earth metal oxide) is adopted. In order to increase the electric resistance, attention should be paid to the content of an alkali having a relatively small ionic radius, such as lithium ions, sodium ions and potassium ions, which have a high mobility. Usually, it is unnecessary for the composition of a glass funnel to contain lithium oxide, and sodium oxide and potassium oxide are contained each in an amount of from about 5 to 9% by molar percentage.

In a case where the chemical tempering method to replace sodium ions with potassium ions by thermal diffusion, is applied to the above-mentioned glass, it is only possible to obtain a compressive stress layer of from about 30 $\mu$m to 40 $\mu$m at best even if it is immersed in a molten solution of $KNO_3$ for 24 hours at about 450° C., since the quantities of sodium oxide and potassium oxide are already well balanced, so that the mobility of potassium ions is low. Further, although the compressive stress value has a value of about 80 MPa in the surface, the compressive stress value attenuates exponentially in a thickness direction i.e. from the surface of the glass to the inside thereof. The depth of a flaw formed during the production process or in the market of the cathode ray tube, is about the same as the compressive stress layer. Accordingly, if the compressive stress layer is too thin, the effect will be lost against a flaw exceeding the thickness of the compressive stress layer. Further, in the state of a cathode ray tube, a vacuum stress is loaded, and the above-mentioned tensile vacuum stress and the strengthened compressive stress are superimposed thereon, whereby the effective thickness of the compressive stress layer decreases remarkably, and the reliability decreases.

On the other hand, other than the ion exchange method by thermal diffusion, chemical tempering by means of a field-assisted type chemical tempering method (hereinafter referred to as a field-assisted method) has been known. As disclosed in JP-A-2001-302278, this method is usually carried out in such a manner that glass is dipped in a molten liquid of potassium nitrate, a molten liquid of sodium nitrate or a molten liquid comprising a mixture thereof; an anode is provided in the molten liquid on the glass surface side to be ion-exchanged, and a cathode is provided in the molten liquid in which the opposite surface is dipped; and a d.c. voltage is applied to carry out ion exchanging at a temperature below the strain point.

The feature of this method is to apply an electric field to increase the mobility of doping ions having a relatively large ionic radius to replace them with ions having a relatively small ionic radius in the glass, thereby to attain a sufficient compressive stress value and a sufficient compressive stress layer depth (thickness) in a short time. Heretofore, the present inventors were successful in producing a light and super flat glass funnel by locally chemically tempering a specific region of a glass funnel by means of the above-mentioned field-assisted type chemical tempering method.

When such a new production technique is practically used, there may be a case where various types of glass funnels having different specifications are supplied simultaneously to a process for producing glass funnels or to a process for producing cathode ray tubes, whereby if, for example, a chemically tempered glass funnel and a non-tempered glass funnel coexist, the two cannot be distinguished at all on their appearance, and thus, not only it becomes difficult to control the production process or products, but also a trouble of mixing them up or the like, is likely.

On the other hand, as a method for coloring glass, there is, for example, a method in which a coloring component is added and dissolved in a glass material to form a color, a so-called staining method in which an aqueous solution of a silver salt or a copper salt or a mixture of such an aqueous solution with e.g. clay, is coated on a glass surface, followed by heating to have alkali ions in the glass ion-exchanged with the silver ions or copper ions, followed by heating in a reducing atmosphere to reduce the above ions to an atomic state, which are further subjected to colloidal coagulation to form a color, or a method wherein a high temperature glass and a molten metal are brought in contact, and a voltage is applied across the glass and the molten metal to dope the above metal into the glass. However, none of these methods has a technical concept of coloring a chemically tempered portion.

Further, an attempt to carry out tempering and coloration of glass by a chemical method (an ion-exchanging method) has been heretofore studied. In such a method, tempering is carried out by potassium ions having an ionic radius larger than the alkali ions in the glass, and coloration is carried out by silver ions. For example, JP-A-46-1329 discloses a method of dipping in a molten salt bath containing potassium ions and silver ions. However, even if this method is used for treatment of a soda lime glass such as a plate glass for an automobile by a thermal diffusion method, it is not possible to accomplish the desired tempering and sufficient coloration at the same time, and thus, a method of carrying out coloration and tempering in two steps, is disclosed wherein dipping in a silver salt bath is carried out first, and then dipping in a potassium salt bath is carried out.

Other related references are as follows.

JP-A-48-71672, JP-A-55-144451, JP-A-61-232250, JP-A-57-175751, JP-B-54-21366, JP-A-55-167157, JP-A-54-21366, JP-A-46-1329, Japanese Patent No. 2,939,415, JP-A-2001-294442, JP-A-2001-348245, JP-A-2001-348248, and JP-A-2002-60242.

A locally chemically tempered glass funnel is desired to be colored at such a portion so that the tempered portion can be visually distinguished for the purpose of facilitating and ensuring the distinction from a non-tempered glass funnel having a similar shape, as mentioned above. However, when tempering and coloration are carried out by a chemical method of the prior art for a common glass product such as the above-mentioned plate glass, the tempering step and the coloration step are carried out separately, whereby an installation and a working space are required for each step, and the time and labor are required for each step, thus leading to a problem that the production cost will be high.

The above-mentioned method of dipping in an organic salt bath containing potassium ions and silver ions simultaneously, requires only one step, but the silver content in the mixed salt bath comprising silver ions and potassium ions as the main components, presents a delicate influence. Namely, if the silver content is low, coloration is very little although tempering may be sufficient, and if the silver content is high, tempering tends to be insufficient, although coloration will be sufficient, whereby it has been difficult to obtain a satisfactory product.

Further, it has not been known that a chemically tempered portion of a glass funnel having a composition totally different from usual soda lime glass, can be colored by an ion-exchanging method at the same time as tempering.

It is an object of the present invention to provide a glass funnel having such a tempered portion colored by carrying out local tempering and coloration of a glass funnel at the same time by a chemical method, and a process for its production.

The present invention has been made in view of the above-mentioned problems and object, and has been accomplished on the basis of a discovery that it is possible to obtain a glass funnel having a chemically tempered portion and a colored portion completely matched, by specifying the glass composition for the glass funnel and by carrying out local chemical tempering and coloration simultaneously by a field-assisted method in the coexistence of a salt to contribute to the chemical tempering and a salt to contribute to the coloration of the glass funnel. It provides the following glass funnel for a cathode ray tube and a process for its production.

1. A glass funnel for a cathode ray tube, which has a substantially rectangular opened end at one end and a neck portion at the other end and which constitutes, together with a glass panel having a substantially rectangular face portion, a glass bulb to be used for a cathode ray tube, wherein the glass constituting the glass funnel contains, by molar percentage, at least 60% of $SiO_2$ and at least 7% of PbO; when the molar percentages of $Na_2O$ and $K_2O$ contained in said glass are represented by WNa and WK, respectively, $0.35 \leq WK/(WNa+WK) \leq 0.6$; a compressive stress layer is formed by chemical tempering at least in the outer surface of a region containing a position where the tensile stress formed when the interior of the glass bulb is vacuumed to produce the cathode ray tube, becomes maximum; and either one or both of the outer surface of the chemically tempered region and the inner surface opposite to said outer surface, are colored by ion exchange coloration.

2. The glass funnel for a cathode ray tube according to Item 1, wherein a compressive stress layer is formed by chemical tempering at least on the outer surface of either one or both of a region containing a position where the thermal stress formed during the assembling of the cathode ray tube, becomes maximum, and a region containing a position where the thermal stress formed during the operation of the cathode ray tube, becomes maximum, and either one or both of the outer surface of the chemically tempered region and the inner surface opposite to said outer surface, are colored by ion exchange coloration.

3. The glass funnel for a cathode ray tube according to Item 1 or 2, wherein tempering ions doped into the glass by the chemical tempering are potassium ions, and ions for ion exchange coloration are at least one member selected from the group consisting of silver ions, cobalt ions, nickel ions, copper ions, iron ions and tin ions.

4. The glass funnel for a cathode ray tube according to Item 1, 2 or 3, wherein the concentration of potassium ions doped into the glass by the chemical tempering, is distributed substantially in a step function manner in the thickness direction of the above compressive stress layer.

5. The glass funnel for a cathode ray tube according to any one of Items 1 to 5, wherein when the maximum value of the tensile stress formed on the outer surface of the funnel when the interior of the glass bulb is vacuumed, is represented by $\sigma_{VF}$, and the maximum compressive stress value of the above compressive stress layer is represented by $\sigma_{cm}$, the relation between said $\sigma_{cm}$ and $\sigma_{VF}$ satisfies $0.03 \leq |\sigma_{VF}/\sigma_{cm}| \leq 0.5$.

6. The glass funnel for a cathode ray tube according to any one of Items 1 to 5, wherein the electron beam deflection angle of the glass funnel is at least 120°.

7. A process for producing a glass funnel for a cathode ray tube, which comprises chemically tempering a region of glass to be chemically tempered in a glass funnel for a cathode ray tube, by a field-assisted type chemical tempering method, in which said region of glass is contacted with a molten salt containing alkali ions having an ionic radius larger than that of alkali ions in said glass, and at the same time, a voltage is applied to said glass from both sides thereof to have the alkali ions in the glass ion-exchanged with the alkali ions in the molten salt having an ionic radius larger than that of the alkali ions in the glass, wherein ions for ion exchange coloration are permitted to coexist in said molten salt so that the chemical tempering region of glass is subjected to ion exchange coloration.

8. The process for producing a glass funnel for a cathode ray tube according to Item 7, wherein the molten salt is potassium nitrate, and from 5 to 50 mol % of silver nitrate is incorporated to the molten salt.

In the present invention, the glass funnel to form a glass bulb for a cathode ray tube, has a compressive stress layer formed by chemical tempering at least on the outer surface of a region containing a position where, when formed into a cathode ray tube, the tensile vacuum stress formed by the application of an atmospheric pressure to the outer surface of the cathode ray tube inside of which is vacuumed, becomes maximum, and, as the case requires, a region containing a position where the thermal stress formed during the assembling of the cathode ray tube or during the operation of the cathode ray tube, becomes maximum, and the glass at the chemically tempered region is colored by ion exchange.

Figure 1:
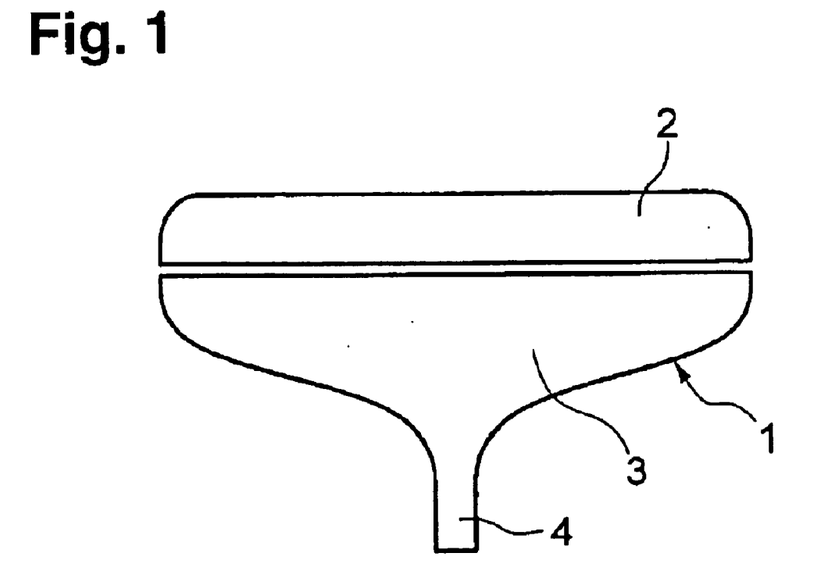
FIG. 1 is a front view of a glass bulb for a cathode ray tube in which the glass funnel of the present invention is used.
Figure 2:
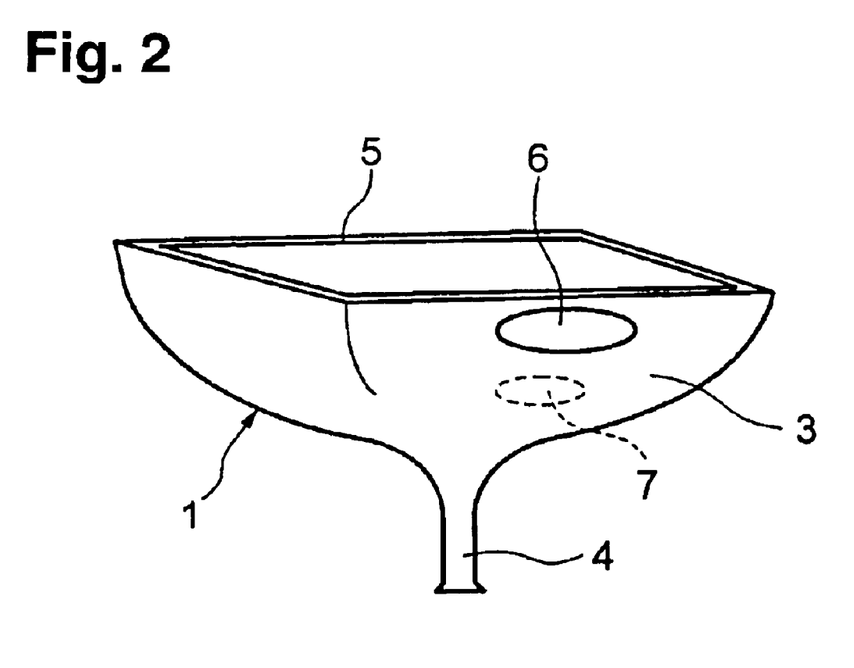
FIG. 2 is a perspective view showing an embodiment of the glass funnel according to the present invention.

As shown in FIG. 1, the glass bulb for a cathode ray tube comprises a glass panel 2 having a substantially rectangular face portion and a glass funnel 1 having a neck portion 4 at one end of a body portion 3 having a substantially rectangular opened end. FIG. 2 is a perspective view showing an embodiment of the glass funnel 1, and its basic shape is substantially the same as conventional one and is a funnel shape as a whole, wherein the body portion 3 has a substantially rectangular opened end 5 at one end.

When a cathode ray tube is prepared by using such glass funnel 1, the maximum tensile vacuum stress is often formed at a portion 6 in the vicinity of the opened end 5 on the short axis of an outer surface of the body portion 3 along its long side, i.e. at a region near the opened end 5 at the central portion of the outer surface of the body portion along its long side. This maximum tensile vacuum stress is not constant, since it varies depending upon the shape, the size, the wall thickness, etc. of the glass funnel 1. However, it increases when the deflection angle is increased to reduce the depth, since the non-sphericity increases. For example, with a glass funnel having a diagonal conjugate diameter of 76 cm and a deflection angle of 135°, the maximum tensile vacuum stress may reach a level of 16 MPa. Due to the maximum tensile vacuum stress, this portion is regarded as the mechanically weakest portion against an external force or a flaw. Further, in the glass funnel 1, a thermal stress will be formed by a heat generated in the sealing step in assembling of a cathode ray tube or during the operation of the cathode ray tube. The maximum thermal stress will be formed at a region 7 close to a yoke portion of the outer surface of the body portion 3, as shown by a dotted line in FIG. 2, and the stress value is from 10 to 15 MPa. Thus, it is small as compared with the above-mentioned vacuum stress, whereby it is unlikely that the glass funnel 1 will break starting from that region, but it is nevertheless a factor to reduce the strength of the glass funnel 1.

Accordingly, the present invention is to chemically temper the portion where the maximum tensile vacuum stress will form in such a glass funnel, and its surrounding region, i.e. at least the outer surface of the region containing the maximum value of the tensile vacuum stress, and to form a compressive stress layer at least in the outer surface of the glass at that region. Further, as the case requires, the present invention is to chemically temper the portion where the above-mentioned maximum thermal stress will form and its surrounding region i.e. at least the outer surface of a region containing the maximum value of the thermal stress and to form a compressive stress layer in the same manner. In the inner surface of each of said regions, a compressive stress is formed, and it is usually sufficient to chemically temper only the outer surface, but if necessary, the inner surface may also be chemically tempered.

Further, the present invention is to color the glass of the chemically tempered portion by ion exchange by using a salt to contribute to chemical tempering and a salt to contribute to coloration, as mixed, at the time of carrying out the above-mentioned chemical tempering by a field-assisted method. In the present invention, such coloration is referred to as ion exchange coloration.

Now, the present invention will be described in detail.

In the present invention, a $SiO_2$—$Al_2O_3$—$PbO$—$R_2O$—$R'O$ type ($R_2O$: an alkali metal oxide and $R'O$: an alkaline earth oxide) glass is used for the glass of the body portion (the portion excluding the neck portion) of the glass funnel. The glass of this type is known as for the glass funnel, which contains at least 60 mol % of $SiO_2$ and at least 7 mol % of $PbO$ in order to obtain electric characteristics and an X-ray shielding effect. In order to realize a mixed alkali effect and predetermined chemical tempering in such glass composition, the content of $K_2O$ based on the sum of the content of $Na_2O$ and $K_2O$ as represented by molar percentage is determined as follows.

Namely, when the molar percentages of $Na_2O$ and $K_2O$ are represented by WNa and WK, respectively, the content of $K_2O$ should satisfy $0.35 \leq WK/(WNa+WK) \leq 0.6$. When $WK/(WNa+WK)$ is in a range of from 0.35 to 0.6, a high electric resistance is obtainable, and such is suited also for chemical tempering. Further, even in a composition added with lithium to facilitate chemical tempering, the content exceeding 2% by molar percentage is not realistic from the viewpoint of matching to the thermal expansion coefficient and economical efficiency. Even in a composition containing not more than 2% of lithium, if the proportion of the content of potassium oxide based on the sum of the contents of lithium oxide, sodium oxide and the potassium oxide, is in a range of from 0.35 to 0.6, the mixed alkali effect can be realized and a high electric resistance is obtainable.

The difference between inner and outer pressures acting on the cathode ray tube is uniform in its plane. Accordingly, a region having a tensile vacuum stress in the glass funnel changes gradually from a location where the maximum tensile vacuum stress $\sigma_{VF}$ is generated to a neutral point where the tensile vacuum stress changes to a compressive vacuum stress, and it occupies a non-negligible surface area in the glass funnel surface.

With a glass funnel having dimensional specifications such that the maximum tensile vacuum stress $\sigma_{VF}$ is less than 10 MPa, there is an advantage that a region requiring strengthening is smaller, but, it is difficult to achieve a sufficient weight reduction. On the other hand, in the dimensional specifications wherein $\sigma_{VF}$ exceeds 40 MPa, a sufficient weight reduction is obtainable, but, a region having a tensile vacuum stress is larger, and a tensile vacuum stress generated near the sealing portion to the glass panel is increased. Accordingly, it is difficult to control the vacuum stress in this portion to be lower than the strength of a sealing material, which is lower than the strength of a material for the glass funnel. Such glass funnel can not provide a sufficient strength of the sealing portion even though the strength of the glass funnel itself can be partly strengthened by chemical tempering. Accordingly, the advantage of locally strengthening the glass funnel is lost.

Further, in order to maximize the advantage of local strengthening, it is preferable to use such dimensional specifications that only either one between opposing short side portions and long side portions which constitute the body portion of the glass funnel is locally strengthened. Namely, it is preferable to form the glass funnel so that the tensile vacuum stress in a side portion which does not have the maximum tensile vacuum stress $\sigma_{VF}$, is less than 10 MPa, because it is unnecessary to strengthen such region.

In the present invention, chemical tempering of the region containing the maximum tensile vacuum stress $\sigma_{VF}$ of a glass funnel and that of the region containing the maximum thermal stress, are the same except that their portions are different, and the maximum thermal stress is small as compared with the maximum tensile vacuum stress, so that it is usually sufficient to carry out local strengthening of the region containing the maximum tensile vacuum stress. Accordingly, only chemical tempering of the region containing the maximum tensile vacuum stress $\sigma_{VF}$ will be described, and with respect to chemical tempering of the region containing the maximum thermal stress, description will be omitted.

Figure 3:
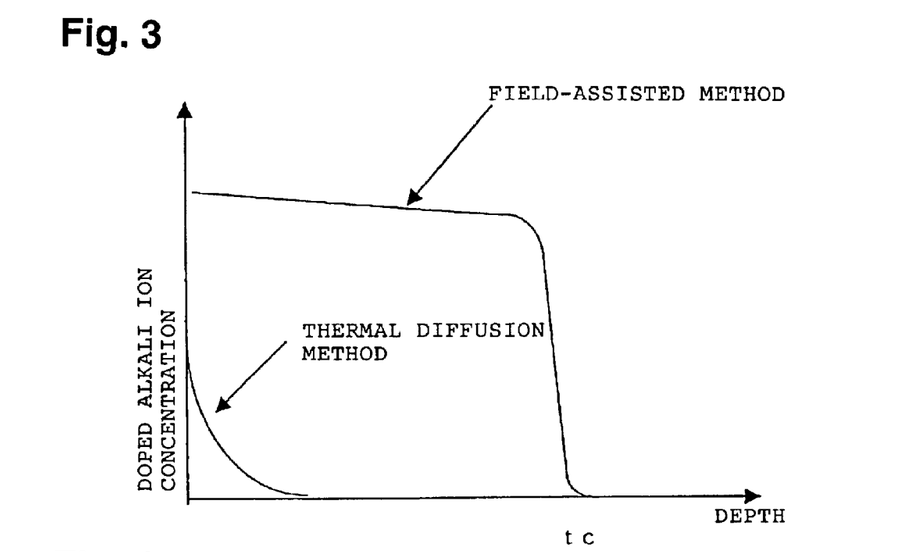
FIG. 3 is a graph showing the relation between the depth of ions doped and the concentration of ions doped by a thermal diffusion method and by a field-assisted method in chemical tempering.

In the case of chemical tempering of glass wherein doped alkali ions and replaced alkali ions are balanced as in the glass composition for a glass funnel, as between the thermal diffusion method and the field-assisted method, the distribution of the concentration and the depth of alkali ions doped into the glass are completely different, as shown in FIG. 3. In the thermal diffusion method, an increase of the doped alkali ion concentration attenuates sharply exponentially from the surface, and it balances with the concentration of the glass composition itself at a relatively shallow point from the surface.

On the other hand, in the field-assisted method, the mobility of ions is increased from an anode side toward a cathode side by the aid of an electric field, whereby ions can be doped relatively easily. Accordingly, a relatively large increase of the concentration can be obtained up to a deeper portion from the surface. In a further deeper portion, the doped alkali ion concentration attenuates rapidly with a nearly vertical distribution. There may be a slight difference in the distribution depending on conditions for ion exchanging. However, the distribution is basically the same because it is typical in the field-assisted method. The distribution of the concentration of alkali ions doped by the field-assisted method changes substantially in a step function manner and is distinctly different from the distribution in an exponential function manner by the thermal diffusion method. The concentration of doped alkali ions is measured by, for example, cutting the chemically tempered portion of glass vertically from its surface, forming a sample by processing the cut face to be a mirror finished surface, and scanning the sample with an X-ray micro-analyzer in the thickness direction from the surface of the glass, whereby it can be measured as a distribution of the concentration of alkali ions.

Figure 4:
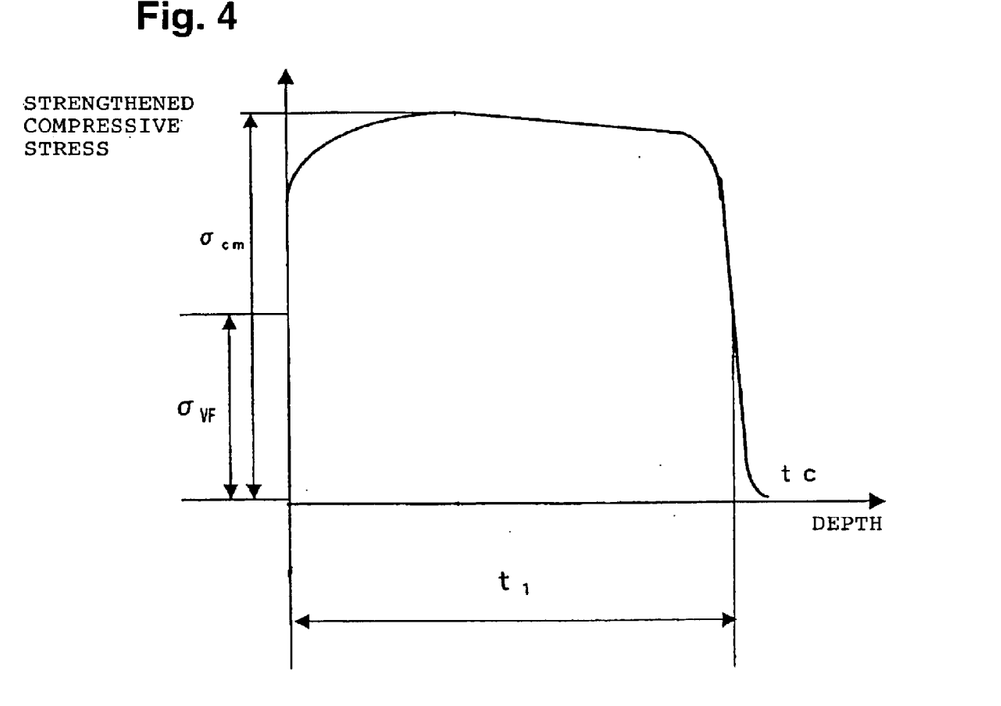
FIG. 4 is a graph showing the strengthened compressive stress by the field-assisted method in the present invention.

The distribution of stress in the compressive stress layer obtained by chemical tempering is in proportion to the doped alkali ion concentration. Accordingly, when the distribution of the concentration of the doped alkali ions is substantially in a step function manner, the distribution of stress in the compressive stress layer will also be a substantially in a step functional distribution, as shown in FIG. 4. Accordingly, in the compressive stress layer obtained by the field-assisted method, the compressive stress distributes from the surface toward the inside of the glass without substantial attenuation as compared with the compressive stress layer obtained by the thermal diffusion method, and the thickness of the compressive stress layer is larger by a few times. Further, the field-assisted method is advantageous also in that the time required for doping ions is shorter.

In a case of using the field-assisted method to conduct ion exchange at a relatively low temperature region which is, for example, about 20° C. lower than the strain point of the glass, the compressive stress value in the compressive stress layer gradually decreases from the maximum value $\sigma_{cm}$ in the vicinity of the surface to attenuate to zero at a point having a depth $t_c$ as shown in FIG. 4. Further, the distribution of the strengthened compressive stress from the surface to $t_c$ is in proportion to the above-mentioned change of the doped alkali ion concentration. Accordingly, even when a tensile vacuum stress is superimposed, a remarkable reduction of the effective thickness of the compressive stress layer is avoidable unlike in the case of the thermal diffusion method because of its having the strengthened compressive stress distribution substantially in a step function manner.

Further, when the treating temperature is made lower in the field-assisted method, stress relaxation is inhibited, and a higher compressive stress value is obtained. However, if the strengthened compressive stress $\sigma_{cm}$ exceeds 350 MPa, an excessive tensile stress layer is formed in an inner portion adjacent to the compressive stress layer. Namely, when a mechanical impact is given, a crack initiated in a portion other than the tempered region expands to the tempered region, and when the crack penetrates the tensile stress layer, an accumulated tensile energy is released to cause fracture instantaneously to thereby invite a severe implosion shrinkage because of a vacuum action in the cathode ray tube.

When ion exchanging is conducted by the field-assisted method at or in the vicinity of the strain point of the glass, or at a relatively high temperature which is about 20° C.

higher than the strain point, stress relaxation takes place near the surface during the ion exchanging treatment by the field-assisted method whereby the strengthened stress decreases, as shown in FIG. 4. As a result, the distribution of the strengthened compressive stress will not be in proportion to the distribution of doped alkali ion concentration to the depth where the stress relaxation takes place. However, such stress relaxation can be controlled within a relatively shallow range unless the temperature is too high or the treating time is too long, and it is possible to maintain the maximum compressive stress $\sigma_{cm}$ at some point from the surface to the depth $t_c$. In a region deeper than this maximum compressive stress $\sigma_{cm}$, the proportional relation can substantially be kept between the distribution of doped alkali ion concentration and the distribution of strengthened compressive stress. The above-mentioned stress relaxation near the surface presents no problem since it is slight.

When ion exchanging is conducted at a temperature further higher than the above-mentioned temperature, the stress relaxation is increased so that the maximum compressive stress $\sigma_{cm}$ is decreased to less than 80 MPa, and the above-mentioned proportional relation is lost, such being undesired. Accordingly, the temperature for the treatment is preferably in a range of $-50°$ C.$\leq$strain point of glass $\leq 10°$ C., more preferably, $-30°$ C.$\leq$strain point of glass $\leq 0°$ C.

From the above, it is preferable that the relation between $\sigma_{VF}$ (MPa) and $\sigma_{cm}$ (MPa) is in a range of $0.03 \leq |\sigma_{VF}/\sigma_{cm}| \leq 0.5$. Namely, when $|\sigma_{VF}/\sigma_{cm}|$ is less than 0.03, $\sigma_{cm}$ exceeding 350 MPa is required as described above, and accordingly, the breaking characteristic becomes deteriorated and a safety level is decreased. Further, when $|\sigma_{VF}/\sigma_{cm}|$ exceeds 0.5, the proportion of $\sigma_{cm}$ to the maximum tensile vacuum stress $\sigma_{VF}$ becomes smaller whereby it is difficult to obtain a desired safety level required for a cathode ray tube.

In the present invention, $\sigma_{VF}$ and $\sigma_{cm}$ can be determined mainly depending on the design specification and conditions for chemical tempering of the glass funnel respectively. However, in order to satisfy the above-mentioned conditions while achieving reduction of the weight of the glass funnel and efficiency for chemical tempering, $\sigma_{VF}$ is preferably in a range of from 10 to 40 MPa for the above-mentioned reason. Further, $\sigma_{cm}$ is preferably in a range of from 80 to 350 MPa.

The delayed fracture of glass is a stress corrosion phenomenon which is affected by moisture existing at the surface. It has been known that even when there is a flaw in the glass surface, which may be a source for causing fracture, the crack does not develop and the delayed fracture does not occur if the glass is in a compressive stress state. When such knowledge is applied to a cathode ray tube using a chemically tempered glass funnel, the delayed fracture does not occur if the region having the maximum tensile vacuum stress is in a compressive stress state.

As described before, the distribution of the strengthened compressive stress formed by the thermal diffusion method, is according to an exponential function, whereby the effective thickness of the compressive stress layer is decreased rapidly when there is a tensile vacuum stress comparable to a strengthened compressive stress. Whereas, the stress distribution in the compressive stress layer formed by the field-assisted method is substantially according to a step function as described before, whereby the reduction in the effective thickness of the compressive stress layer is substantially negligible even when there is a tensile vacuum stress having a magnitude comparable to the strengthened compressive stress.

Further, the effective thickness of the compressive stress layer can be deemed to be the depth to a point $t_1$ at which the strengthened compressive stress and the maximum tensile vacuum stress $\sigma_{VF}$ are balanced, as shown in FIG. 4. It is preferable that $t_1$ is from 60 to 200 $\mu$m. In order to secure the effective thickness of the compressive stress layer against the maximum tensile vacuum stress $\sigma_{VF}$ or a flaw, $t_1$ is required to be 60 $\mu$m or more. It has been known that in a usual condition of use, the depth of a flaw given to the surface of a cathode ray tube during operation is 30 $\mu$m as much as the depth of a flaw abraded by using a #150 emery sheet, or less. Further, even in a case of applying a flaw with a sharp cutter, it is enough to assume a depth of about 60 $\mu$m at the most. Accordingly, if the thickness of the compressive stress layer is less than 60 $\mu$m, it is difficult to secure the desired thickness in the application of the maximum tensile vacuum stress, and safetiness against an assumed flaw may not be obtained.

However, if $t_1$ exceeds 200 $\mu$m, the time required for ion exchanging will be long, whereby stress relaxation takes place in the surface. Further, a large tensile stress layer will be formed at the central portion in the thickness direction of glass adjacent to the compressive stress layer, as described before, and the practicability will be lost.

In the determination of the dimensional specifications for the glass funnel, a region having a tensile vacuum stress of 10 MPa or more and having the second peak next to $\sigma_{VF}$ may be provided at a side portion where no maximum tensile vacuum stress $\sigma_{VF}$ is generated, namely, in an outer surface of the body portion at a shorter side adjacent to a longer side when $\sigma_{VF}$ is generated at the longer side, from the viewpoint of weight reduction and moldability of the glass funnel. In such case, it is preferred to chemically temper a part of the outer surface of the body portion at the longer side where the maximum tensile vacuum stress $\sigma_{VF}$ is generated, and at the same time, the above-mentioned region at the shorter side is also locally chemically tempered. Namely, the region of the outer surface of the body portion in which a tensile vacuum stress of at least 10 MPa is generated, is appropriately chemically tempered, as the case requires.

In such case, the respective chemically tempered regions of the longer and shorter sides would be different in the required degrees of strengthened compressive stresses and in the required thicknesses of tempered stress layers. Accordingly, it should be avoided to provide only a pair of electrodes so that a region bridging adjacent sides is subjected to ion exchanging to form a continuous chemically tempered region, and it is preferable to use separate electrode structures wherein at least anodes are provided independently at all 4 sides on the outer surface of the body portion so as to facilitate control of the respective voltages and times.

In the present invention, the glass at the chemically tempered region of the glass funnel is colored by ion exchange as described above, so that it is thereby possible to visually judge or distinguish the chemically tempered product or the chemically tempered region. Namely, coloring ions are doped into the glass at the chemically tempered region to color the glass at that region with a color different from the intrinsic color of the glass funnel. Such coloring ions may be at least one member selected from the group consisting of silver ions, cobalt ions, nickel ions, copper ions, iron ions and tin ions. Among them, silver ions are superior from the viewpoint of the coloring property or doping efficiency of ions, and silver ions are usually doped.

In a case where coloring ions are to be doped to the glass at the chemically tempered region, it is usual that, as described hereinafter, a salt containing coloring ions is mixed to the molten salt for chemical tempering to let coloring ions and tempering ions coexist, whereby the coloring ions are doped for coloration at the same time as tempering treatment by ion exchange. Accordingly, for example, when the outer surface of a region containing the maximum tensile vacuum stress of a glass funnel is chemically tempered by ion exchange by means of potassium ions, the glass of the chemically tempered portion in the outer surface will be colored by ion exchange. It is, of course, possible to color the inner surface of said region by ion exchange, so that the chemical tempering can be applied also to the inner surface. In a case where the chemical tempering and the ion exchange coloration are carried out simultaneously, if the doping amount of the coloring ions is too much, the compressive stress obtainable by chemical tempering tends to decrease, and no adequate strength tends to be obtained. On the other hand, if the doping amount is too small, irregularities are likely to result in coloration, and good coloration tends to be hardly obtainable, although the compressive stress will not substantially decrease. By the doping of coloring ions, the compressive stress decreases as compared with a case where no coloring ions are doped. However, in the present invention, by optimizing the doping amount of coloring ions to the glass composition of the glass funnel, the reduction in the compressive stress is minimized to secure the desired strength.

Figure 5:
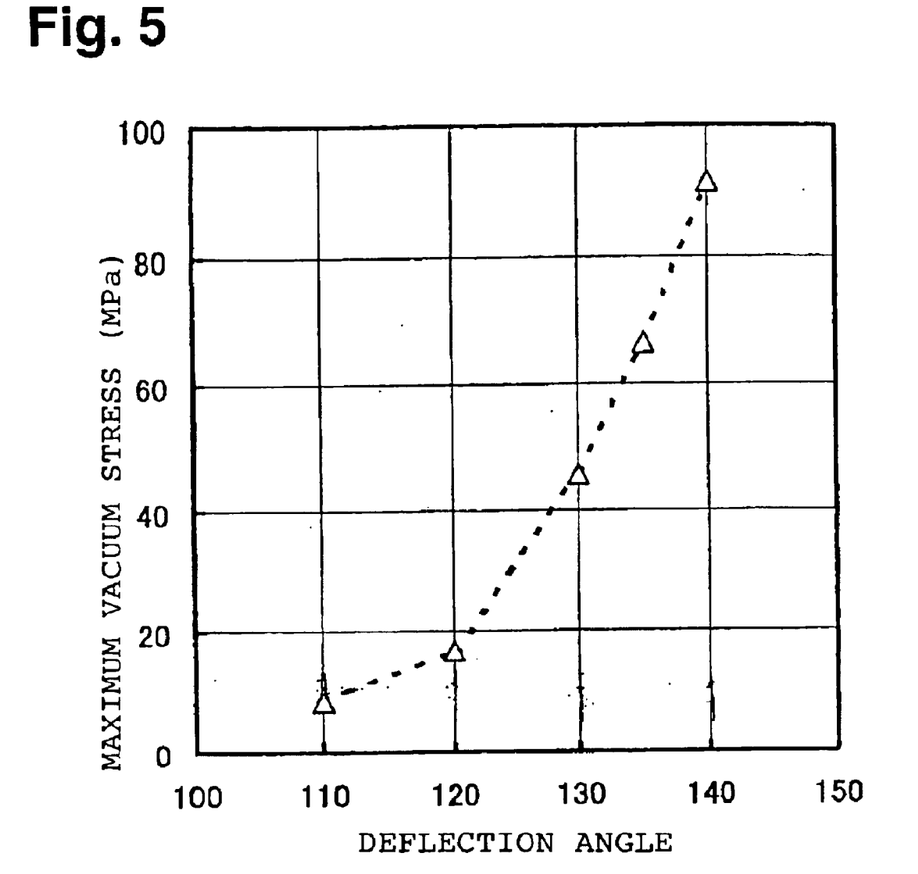
FIG. 5 is a graph showing the relation between the deflection angle and the maximum tensile vacuum stress in the glass funnel.

The present invention is effective to a glass funnel wherein the deflection angle of electron beam is large and to a flattened cathode ray tube (the bulb axis being shortened) using such a glass funnel. FIG. 5 shows the relation between the deflection angle and the maximum tensile vacuum stress generated in the body portion of the glass funnel, in a case where the diagonal deflection angle of electron beam is increased in a glass funnel for a cathode ray tube having a screen size of, for instance, a diagonal conjugate diameter of 86 cm and an aspect ratio of 16:9, manufactured by Asahi Glass Company, Limited. Here, the deflection angle is determined by an angle of a line connecting the center of a reference line as a virtual reference line to the effective edge of the diagonal axis of the inner plane of the face portion, and defined by EIAJ ED-2134B, standard of Japan Electronics and Information Technology Industries Association (JEITA).

As is clear from FIG. 5, with the glass funnel, the maximum tensile vacuum stress in the body portion gradually increases as the deflection angle increases, and it sharply increases from 10 MPa where the deflection angle is 110° to 67 MPa where it is 135°. It is almost impossible to secure adequate strength by thermal tempering against such a high tensile vacuum stress. From this, it should be understood that the present invention is effective to reduce the weight of a flattened glass funnel, particularly a glass funnel with a wide angle wherein the deflection angle is substantially 120° or more.

Now, the chemical tempering method by a field-assisted method and the ion exchange coloration method of the present invention will be described in detail.

The present invention is suitable for a glass funnel of a glass composition having alkali oxides balanced in order to obtain the above-mentioned mixed alkali effect, and it is to locally or selectively strengthen a region of the glass funnel where the tensile vacuum stress or the thermal stress is locally high and to color such a region by ion exchange at the same time. Namely, it is not that the outer surface of the body portion of the glass funnel is uniformly colored or tempered by the field-assisted method, but a portion in the outer surface of the body portion where a large tensile vacuum stress is generated whereby fracture is likely to result, specifically, a region including a portion where the maximum tensile vacuum stress $\sigma_{VF}$ is generated or a region containing the maximum value of the thermal stress, and if necessary, a region where a tensile vacuum stress of a magnitude to cause a trouble, is generated (hereinafter generally referred to as a high tensile stress region), are locally treated.

In order to locally temper or locally color such a high tensile stress region of a glass funnel by ion exchange, it is preferable to employ a paste chemical tempering method. By this method, an anode is formed at a high tensile stress region on the outer surface of the body portion of a glass funnel by a paste comprising a salt containing alkali ions having an ionic radius larger or equal to alkali ions in the glass and a salt containing e.g. silver ions for coloration, the alkali ions in the glass are replaced with the alkali ions in the paste, and at the same time, the silver ions are doped, whereby only the region where the above anode is provided, can be locally chemically tempered and colored by ion exchange.

In the present invention, the paste can be obtained by adding clay and a solvent to the salts and mixing them. The viscosity of the paste is regulated by adjusting the amount of the solvent so that it is about 200 Pa·s in consideration of working efficiency for coating, prevention of oozing of the solvent and so on. As the salt containing alkali ions, potassium nitrate or potassium carbonate may, for example, be mentioned as a typical example, but usually, potassium nitrate is employed. Further, a plurality of salts may be used in combination, or as the case requires, another component may be added. As the salt containing silver ions, silver nitrate is usually employed. The above-mentioned clay serves to disperse and mix the salts uniformly and to make a paste by the addition of the solvent. Kaolin or the like containing silicon dioxide as the main component may preferably be employed.

In a case where potassium nitrate is used as the salt containing alkali ions for tempering and silver nitrate is used as the salt containing silver ions for coloration, the mixing ratio of the potassium nitrate and the silver nitrate is preferably such that the silver nitrate is within a range of from 5 to 50 mol %, more preferably within a range of from 10 to 40 mol %. If the silver nitrate is less than 5 mol %, the coloration tends to be non-uniform, and the compressive strength by potassium ions tends to be non-uniform, such being undesirable. On the other hand, if the silver nitrate exceeds 50 mol %, the compressive stress tends to be low, whereby it tends to be difficult to obtain the desired level of chemical tempering.

As the above solvent, most preferred is an organic solvent which disappears by decomposition or evaporates completely at a temperature lower than the melting points of the above-mentioned salts. Water which used to be employed oozes and spreads from a paste-applied portion if used to a glass surface having a three-dimensional structure such as the body portion of the glass funnel, whereby a region broader than the portion to which the paste is applied, will be chemically tempered. The spread of water varies depending upon the thickness of the paste, moisture, the glass surface condition such as roughness or inclination, etc. Accordingly, it is difficult to make the area to be chemically tempered to be substantially constant.

Whereas, an organic solvent is advantageously in that such a problem of using water as a solvent, can easily be eliminated. As such an organic solvent, propylene glycol, ethylene glycol or glycerol may, for example, be mentioned. Particularly preferred is propylene glycol or ethylene glycol.

The organic solvent to be selected is one having a predetermined molecular weight so that it is liquid at room temperature.

The paste is applied locally as an anode at the high tensile stress region of at least the outer surface of the body portion of a glass funnel. In such a case, the anode may be formed by applying the paste directly on the glass surface, or applying the paste preliminarily on an electrode material and attaching the electrode material to the glass surface at the high tensile stress region. Further, the surface area to be covered by the anode is determined primarily on such a basis that a region wherein the vacuum stress is 10 MPa or more should be covered. Of course, the anode may be formed in a broader region, but there is no particular merit to apply chemical tempering at a portion where no strengthening is required. The thickness of the anode is not particularly limited, but it is preferably from about 1 to 5 mm, because if it is too thin, it will be difficult to obtain a desired level of ion exchange.

On the other hand, a cathode is formed at an inner side of the body portion of the glass funnel. The cathode may be formed by using the same paste as the anode in the same manner as above, but it is not limited to one prepared by such technique. Further, the cathode may be formed in a single form wherein the cathode extends continuously as a common electrode on the inner side of the body portion, or may be in a separate form wherein the cathode is an independent electrode corresponding to each anode. However, the later form is suitable for controlling separately the voltage applied during ion exchanging.

The glass used for the glass funnel has an extremely high electric resistance in comparison with an ordinary soda lime glass because of its required characteristics. For example, the specific resistance of the glass used for the glass funnel is $3.16 \times 10^{12}$ $\Omega$cm, whereas that of the soda lime glass is $3.16 \times 10^{8}$ $\Omega$cm. In order to feed a current to such glass, a fairly high voltage is needed. However, the application of an extremely high voltage causes dielectric breakdown because the glass can not withstand such voltage. On the contrary, in a case of a low voltage, an electric current value fed in the glass is small, and the assisting effect for alkali ion exchange can not sufficiently be obtained. Therefore, it takes a very long time for the chemical tempering treatment, such being industrially not practical.

In order to carry out ion exchanging by the field-assisted method efficiently in a short time without causing the dielectric breakdown of such glass having a large electric resistance, it is important to control the applied voltage properly depending upon the thickness of the glass at the portion to be subjected to ion exchanging. It is desirable to carry out it in a range of $5 \leq (V/\mathrm{Log}_e \rho)/T \leq 15$, where V represents the voltage (V) applied through the glass, $\rho$ represents the specific resistance ($\Omega$ cm) at the strain point of the glass, and T represents the minimum thickness (mm) of the glass in the region to be chemically tempered. In particular, a range of $7 \leq (V/\mathrm{Log}_e \rho)/T \leq 11$ is further preferable. When the ion exchanging time is to be shortened, the applied voltage V should be high and $(V/\mathrm{Log}_e \rho)/T$ be large. However, if $(V/\mathrm{Log}_e \rho)/T$ exceeds 15, dielectric breakdown is likely to occur in the glass. On the other hand, if the applied voltage is low, the treating time increases sharply. In order to chemically temper a glass funnel having a high electric resistance in a time as short as possible, it is practically desirable that $(V/\mathrm{Log}_e \rho)/T$ is 5 or more.

Thus, in order to actually chemically temper and color by ion exchange a glass funnel provided with an anode and a cathode, the glass funnel is heated to, for example, about 450° C. In the course of heating, the solvent in the paste disappears by decomposition or evaporates completely. Then, when the temperature reaches about 450° C., the salts, e.g., potassium nitrate and silver nitrate contained in the electrode will melt and fuse to the glass surface. In such state, a voltage of from about 200 to 500 V is applied across the anode and the cathode, and potassium ions of the molten potassium nitrate are doped into the glass funnel under the predetermined condition for voltage application whereby the potassium ions are replaced with alkali ions in the glass whose ionic radius is smaller than that of the potassium ions. At the same time, silver ions are doped into the glass for coloration. Even after termination of the application of the voltage, silver ions will be continuously doped although slightly, so long as the molten salts are contacted. Thus, with the glass funnel, the high tensile stress region is chemically tempered, whereby a desired compressive stress layer is formed, and at the same time, it is colored dark brown or reddish brown by silver ions doped by ion exchange, whereby the glass funnel can be instantly visually judged to be one chemically tempered.

Although not illustrated in the drawings, the present invention is applicable also to a glass funnel for a cathode ray tube having plural electron guns, wherein a plurality of neck portions are provided on a single body of a glass funnel.

Now, the present invention will be described in further detail with reference to Examples. However, it should be understood that the present invention is by no means restricted to such specific Examples.

EXAMPLES 1 AND 2 AND COMPARATIVE EXAMPLES 1 and 2

Pastes are prepared by changing the molar ratio of potassium nitrate and silver nitrate. Such a paste is coated on both sides of a glass sample (the same glass composition as product code 0138 glass for glass funnel, manufactured by Asahi Glass Company, Limited) of 50 mm×50 mm×10 mm in thickness, to form an anode and a cathode, and such a glass sample is chemically tempered under the aftermentioned voltage application conditions by means of a field-assisted method. Then, with respect to the compressive stress layer formed on the anode side of the glass sample, the color is judged, the compressive stress value and the compressive stress depth are measured by a polarizing microscope. The results are shown in Table 1.

In each Example, the paste is prepared to have a mass ratio of the nitrate salts (potassium nitrate+silver nitrate):kaolin:propylene glycol=6.5:3.5:3, and the voltage application conditions of the field-assisted method are such that the temperature is 450° C., the applied voltage is 300 V and the quantity of electricity is 4 coulomb/cm² (application time: about 40 minutes). In Table 1, "Ag mol %" is mol % of silver nitrate based on all nitrates.

In each Example, the compressive stress value is measured as follows.

As one of methods for measuring the stress of glass, there is a measuring method utilizing the nature that the difference in the refractive index in the main stress direction formed when the glass receives a force, is proportional to the difference in the stress. When a linear polarized light is passed through a stressed glass, the transmitted light will be divided into component waves having planes of polarization mutually crossing in the respective main stress directions and which are different in speed. The respective component waves are such that after passing through the glass one will be delayed than another, and the refractive index of the glass is different in each main stress direction depending upon the speed of each component wave. The difference in the stress of glass is proportional to the difference in the refractive index i.e. the so-called birefringence. Accordingly, if the phase difference of a component wave is determined, the stress can be measured.

By a polarizing microscope utilizing this principle, by passing a light through the glass cross section having a residual stress, the stress is measured by measuring the phase difference of a component vibrating in the main stress direction after the transmission. At that time, a polarizer is disposed before the transmission through the glass, and a plate having a phase difference and an analyzer to detect a polarized light are disposed after the transmission through the glass. As an example of the plate having a phase difference, a Berec compensator, a Babinet compensator and a ¼ wavelength plate may be mentioned. By using such a plate, a dark line can be prepared to bring the phase difference at the region to be measured to 0, whereby the value of the stress can be obtained from the degree of adjustment of the compensator.

Further, by utilizing instead of the above-mentioned various compensators a sensitive tint plate having an optical path difference of about 565 nm whereby an interference color will change by a slight change in the optical path difference, it is possible to show an interference color corresponding to the phase difference due to a slight birefringence after the transmission through the glass, whereby the level of the stress can be distinguished by the color. Utilizing this nature, the glass cross section is observed, whereby the thickness of the stress layer is measured. In the Examples, a Berec compensator is used as the plate having a phase difference.

From the results, it is evident that the thickness (the depth) of the compressive stress layer does not substantially change even if the proportion of silver nitrate to all nitrates is changed, but others receive substantial influences. Namely, in Example 1 where silver nitrate is 12 mol % and in Example 2 where silver nitrate is 25 mol %, the chemically tempered portions are uniformly colored, and the desired compressive stress values can be obtained. However, as in Comparative Example 1, if silver nitrate is less than 5 mol %, the compressive stress value may be sufficient, but coloration tends to be mottling and can hardly be regarded as satisfactory. Inversely, as in Comparative Example 2, if it exceeds 50 mol %, coloration is good, but the absolute value of the compressive stress decreases to a point close to the maximum tensile vacuum stress, whereby the strength can not be regarded as sufficient. Further, it can be confirmed that the compressive stress in the compressive stress layer is distributed substantially in a step function manner.

TABLE 1

|  | Example 1 | Example 2 | Comp. Example 1 | Comp. Example 2 |
| --- | --- | --- | --- | --- |
| Mol % of Ag | 12 | 35 | 3 | 60 |
| Coloration | Yes | Yes | Yes | Yes |
| Uniformity of coloration | Uniform | Uniform | Non-uniform | Uniform |
| Compressive stress value (MPa) | 202 | 156 | 251 | 45 |
| Compressive stress depth ($\mu$m) | 60 | 61 | 60 | 62 |

As described in the foregoing, according to the present invention, a high tensile stress region of the body portion of a glass funnel is locally chemically tempered and at the same time coloring ions are doped to the glass at the chemically tempered portion for coloration, whereby a glass funnel can be obtained which is light in weight and safe in strength and whereby the deflection angle of electron beam can be increased and the depth can be shortened, and further, the fact that the glass funnel is chemically tempered, can be instantly visually judged. Thus, the control in the process for processing glass funnels or in the process for producing cathode ray tubes can thereby be made easy and troubles can thereby be solved.

Further, according to the present invention, the chemical tempering and coloration of the glass funnel are carried out by a field-assisted method, whereby the chemical tempering and coloration can be efficiently carried out simultaneously by the same installation, and an ion exchange-colored chemically tempered glass funnel can be produced at a low cost. Further, the compressive stress can be distributed substantially in a step function manner in the thickness direction of the glass, whereby even when a large tensile vacuum stress is exerted when made into a cathode ray tube, the effective thickness of the above-mentioned compressive stress layer can continuously be secured. Still further, by carrying out the above-mentioned chemical tempering by a combination of the field-assisted method and the paste chemical tempering method, chemical tempering and ion exchange coloration of a glass funnel having a large size and a three dimensional structure, can be simply and conveniently carried out.

The entire disclosure of Japanese Patent Application No. 2002-182994 filed on Jun. 24, 2002 including specification, claims, drawings and summary is incorporated herein by reference in its entirety.

What is claimed is:

1. A glass funnel for a cathode ray tube, which has a substantially rectangular opened end at one end and a neck portion at the other end and which constitutes, together with a glass panel having a substantially rectangular face portion, a glass bulb to be used for a cathode ray tube, wherein the glass constituting the glass funnel contains, by molar percentage, at least 60% of $SiO_2$ and at least 7% of PbO; when the molar percentages of $Na_2O$ and $K_2O$ contained in said glass are represented by WNa and WK, respectively, $0.35 \leq WK/(WNa+WK) \leq 0.6$; a compressive stress layer is formed by chemical tempering at least in the outer surface of a region containing a position where the tensile stress formed when the interior of the glass bulb is vacuumed to produce the cathode ray tube, becomes maximum; and either one or both of the outer surface of the chemically tempered region and the inner surface opposite to said outer surface, are colored by ion exchange coloration.

2. The glass funnel for a cathode ray tube according to claim 1, wherein a compressive stress layer is formed by chemical tempering at least on the outer surface of either one or both of a region containing a position where the thermal stress formed during the assembling of the cathode ray tube, becomes maximum, and a region containing a position where the thermal stress formed during the operation of the cathode ray tube, becomes maximum, and either one or both of the outer surface of the chemically tempered region and the inner surface opposite to said outer surface, are colored by ion exchange coloration.

3. The glass funnel for a cathode ray tube according to claim 2, wherein tempering ions doped into the glass by the chemical tempering are potassium ions, and ions for ion exchange coloration are at least one member selected from the group consisting of silver ions, cobalt ions, nickel ions, copper ions, iron ions and tin ions.

4. The glass funnel for a cathode ray tube according to claim 1, wherein the concentration of potassium ions doped into the glass by the chemical tempering, is distributed substantially in a step function manner in the thickness direction of the above compressive stress layer.

5. The glass funnel for a cathode ray tube according to claim 1, wherein when the maximum value of the tensile stress formed on the outer surface of the funnel when the interior of the glass bulb is vacuumed, is represented by $\sigma_{VF}$, and the maximum compressive stress value of the above compressive stress layer is represented by $\sigma_{cm}$, the relation between said $\sigma_{cm}$ and $\sigma_{VF}$ satisfies $0.03 \leq |\sigma_{VF}/\sigma_{cm}| \leq 0.5$.

6. The glass funnel for a cathode ray tube according to claim 1, wherein the electron beam deflection angle of the glass funnel is at least 120°.

* * * * *